(12) United States Patent
Cutrer, Jr.

(10) Patent No.: US 7,743,697 B2
(45) Date of Patent: Jun. 29, 2010

(54) STEAM COOKER

(76) Inventor: Monroe J. Cutrer, Jr., 17255 U.S. Highway #1, Alma, GA (US) 31510

( * ) Notice: Subject to any disclaimer, the term of this patent is extended or adjusted under 35 U.S.C. 154(b) by 1278 days.

(21) Appl. No.: 11/193,816

(22) Filed: Jul. 29, 2005

(65) Prior Publication Data

US 2006/0021521 A1 Feb. 2, 2006

Related U.S. Application Data

(60) Provisional application No. 60/592,762, filed on Jul. 30, 2004.

(51) Int. Cl.
*A47J 37/07* (2006.01)
(52) U.S. Cl. .......................... 99/339; 126/348
(58) Field of Classification Search ........................ None
See application file for complete search history.

(56) References Cited

U.S. PATENT DOCUMENTS

| | | | | |
|---|---|---|---|---|
| 3,604,895 A * | 9/1971 | MacKay | .................. | 219/401 |
| 4,350,086 A * | 9/1982 | Wetzel | .................. | 99/368 |
| 4,460,822 A * | 7/1984 | Alden et al. | .................. | 219/401 |
| 4,462,308 A | 7/1984 | Wang | | |
| 4,552,123 A * | 11/1985 | Birkner et al. | .................. | 126/20 |
| 4,648,382 A * | 3/1987 | Greenbacker | .................. | 126/348 |
| 4,700,618 A * | 10/1987 | Cox, Jr. | .................. | 99/339 |
| 4,862,794 A * | 9/1989 | Lapeyre et al. | .................. | 99/443 C |
| 5,279,212 A * | 1/1994 | Coupe | .................. | 99/330 |
| 5,996,572 A * | 12/1999 | Ilagan | .................. | 126/25 AA |
| 6,604,453 B2 | 8/2003 | Niese | | |
| 7,059,318 B2 * | 6/2006 | Cornfield | .................. | 126/41 R |
| 7,156,087 B1 * | 1/2007 | Churchill et al. | .................. | 126/25 R |
| 2003/0070559 A1 * | 4/2003 | Victor | .................. | 99/417 |
| 2003/0136270 A1 * | 7/2003 | Joshi et al. | .................. | 99/330 |
| 2008/0053317 A1 * | 3/2008 | Estermann et al. | .................. | 99/468 |
| 2009/0107477 A1 * | 4/2009 | Frock et al. | .................. | 126/20.2 |

OTHER PUBLICATIONS

Jenny Stacey, Full Steam Ahead for a Healthier Diet, [online], 1999, Quintet Publishing [retrieved on Jul. 13, 2005 from internet], www.grandtimes.com/Hot_Cooking.html.

* cited by examiner

*Primary Examiner*—Thor S Campbell
(74) *Attorney, Agent, or Firm*—Adams Intellectual Property Law

(57) ABSTRACT

A steam cooker includes a steam chamber for initially containing water to be converted to steam, and a holding chamber in fluid communication with the steam chamber for receiving the steam. The holding chamber has an opening proximate a first end for receiving an item to be heated by the steam, and is positioned at an angle of inclination so that condensation formed on an interior surface of the holding chamber drains away from the opening and towards a second end positioned lower than the opening. A burner can heat the steam chamber to convert the water into steam. The burner can be connected to a tank of combustible gas. The steam cooker can be constructed of aluminum.

14 Claims, 6 Drawing Sheets

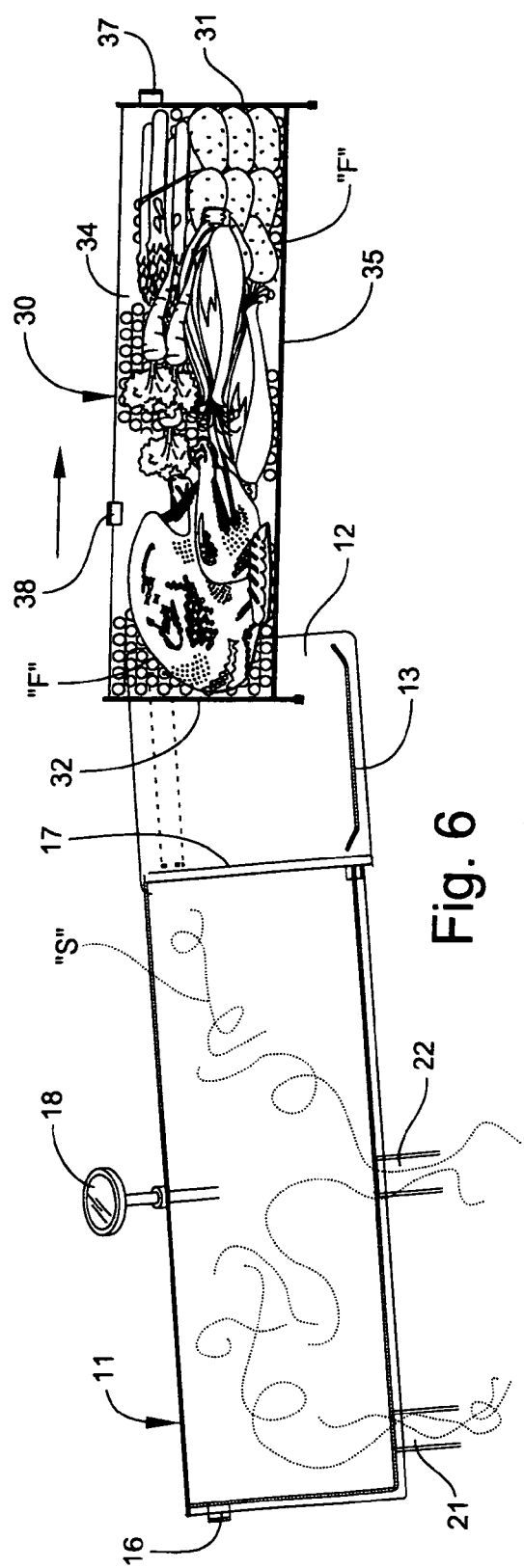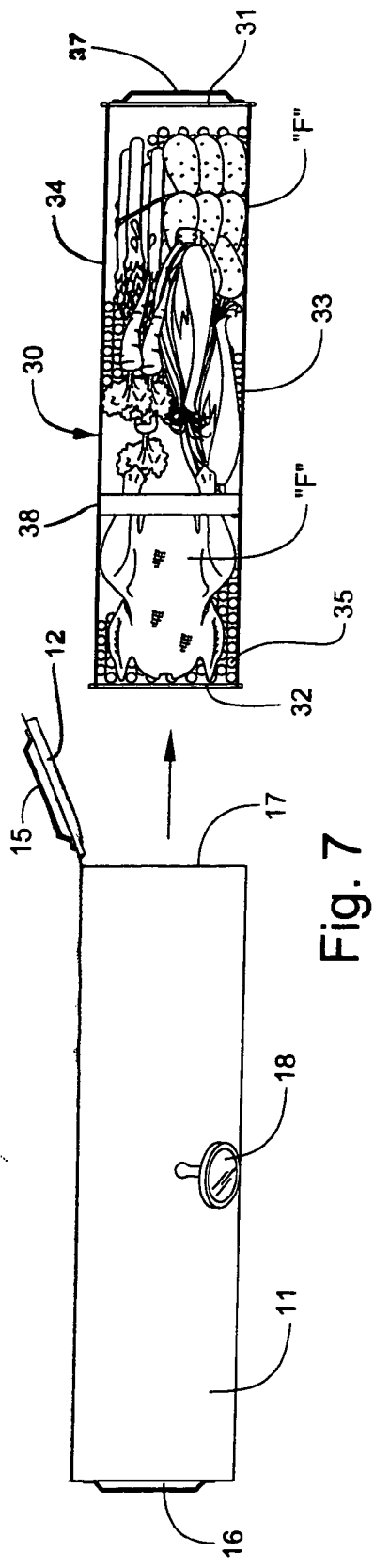

STEAM COOKER

This application claims priority to U.S. Provisional Application No. 60/592,762, filed Jul. 30, 2004.

TECHNICAL FIELD AND BACKGROUND OF THE INVENTION

The invention of the present application relates to a cooker for delivering a continuous stream of steam.

The practice of cooking food with steam is believed to be centuries old, and has gained in popularity in recent years. The increased interest in steam cooking is attributable in part to greater health consciousness and emphasis on healthy diets. Steam cooking is considered to be a healthy means for preparing food as it generally provides greater nutrition than other cooking methods. For example, boiling vegetables reduces their Vitamin C content in vegetables by approximately 70%, while steam cooking results in only a 40% reduction in Vitamin C. Furthermore, steam cooking does not add fat to foods as does frying in oil. In addition, steam cooking is efficient as it imparts more energy to the food than boiling water. For these reasons, it is desirable to provide an apparatus that can efficiently cook food with steam.

SUMMARY OF THE INVENTION

Therefore, it is an object of the invention to provide a cooker that efficiently delivers a continuous supply of steam to food being cooked.

It is another object of the invention to provide an apparatus for cooking food with steam that is powered by a gas, such as propane.

These and other objects of the present invention are achieved in the preferred embodiments disclosed below by providing an apparatus for generating steam having a steam chamber for initially containing water to be converted to steam, and a holding chamber in fluid communication with the steam chamber for receiving the steam. The holding chamber has an opening proximate a first end for receiving an item to be heated by the steam, and is positioned at an angle of inclination so that condensation formed on an interior surface of the holding chamber drains away from the opening and towards a second end positioned lower than the opening.

According to a preferred embodiment of the invention, a food cooker includes a steam chamber for initially containing water, means for converting the water into steam, and a holding chamber in fluid communication with the steam chamber for receiving the steam. The holding chamber has an opening proximate a first end for receiving a food item to be cooked by the steam, and is positioned at an angle of inclination so that condensation formed on an interior surface of the holding chamber drains away from the opening and towards a second end positioned lower than the opening.

According to another preferred embodiment of the invention, the food cooker includes a container for containing the food item to be cooked by the steam. The container can be positioned within the holding chamber, and at least a portion of the container is removable from the holding chamber for removing the food.

According to yet another preferred embodiment of the invention, the food cooker is made of aluminum.

According to yet another preferred embodiment of the invention, the container is a basket having a plurality of apertures, and the holding chamber is shaped to conform to the basket.

According to yet another preferred embodiment of the invention, a first handle is mounted at the first end of the holding chamber and a second handle mounted at the second end of the holding chamber for facilitating lifting and movement of the food cooker.

According to yet another preferred embodiment of the invention, the food cooker includes a door proximate the opening in the holding chamber so that the opening can be selectively opened and closed.

According to yet another preferred embodiment of the invention, a retaining member is positioned on an interior surface of the door proximate a bottom edge of the door for collecting condensation formed on the interior surface of the door so that condensation is prevented from escaping the holding chamber when the door is opened.

According to yet another preferred embodiment of the invention, the food cooker includes a latch for locking the door in the closed position.

According to yet another preferred embodiment of the invention, the food cooker includes at least one leg member for supporting the holding chamber on a base surface.

According to yet another preferred embodiment of the invention, the food cooker includes first and second leg members for supporting the steam chamber and the holding chamber on a base surface, and the first and second leg members are connected by a transverse stabilizer bar.

According to yet another preferred embodiment of the invention, a burner is positioned proximate the steam chamber, and the burner heats the steam chamber to convert the water to steam.

According to yet another preferred embodiment of the invention, the burner is in communication with a tank containing a combustible gas.

According to yet another preferred embodiment of the invention, the combustible gas includes one or more of propane, butane and natural gas.

According to yet another preferred embodiment of the invention, at least one valve is connected to the tank to regulate the flow of gas from the tank to the burner.

According to yet another preferred embodiment of the invention, the steam chamber has a first opening for receiving the water and a second opening proximate a bottom of the steam chamber for draining the water. The first opening is positioned higher than the second opening.

According to yet another preferred embodiment of the invention, a temperature gauge is operatively connected to a thermometer positioned inside the holding chamber for displaying the temperature inside the holding chamber.

According to yet another preferred embodiment of the invention, a method for cooking food using steam includes the step of providing a steam cooker having a steam chamber for containing water, and a holding chamber in fluid communication with the steam chamber for receiving the steam. The holding chamber has an opening proximate a first end for receiving a container, and is positioned at an angle of inclination so that condensation formed on an interior surface of the holding chamber is directed away from the opening and towards a second end positioned lower than the opening. Water is poured into the steam chamber, and the steam chamber is heated to convert the water to steam. At least one food item is placed in the container, and the container is positioned within the holding chamber.

According to yet another preferred embodiment of the method of the invention, a burner is connected to a combustible gas supply to heat the steam chamber.

According to yet another preferred embodiment of the method of the invention, the container is removed from the holding chamber.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 6 is a partial cross sectional side elevation of the steam cooker of FIG. 1; and FIG. 7 is a partial top plan view of the steam cooker of FIG. 1.

DESCRIPTION OF THE PREFERRED EMBODIMENT AND BEST MODE

Figure 1:
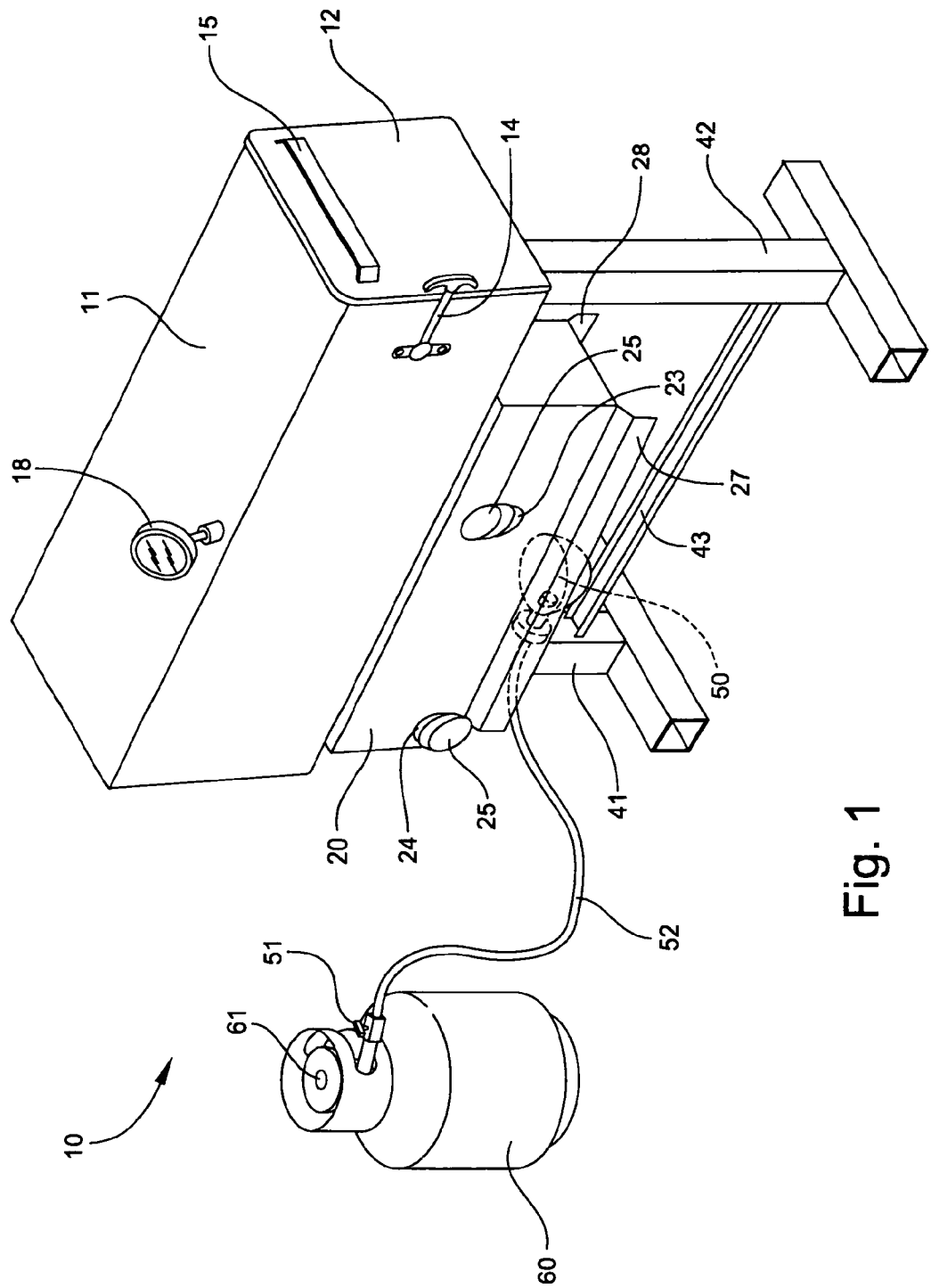
FIG. 1 is a perspective view of a steam cooker according to a preferred embodiment of the invention.
Figure 2:
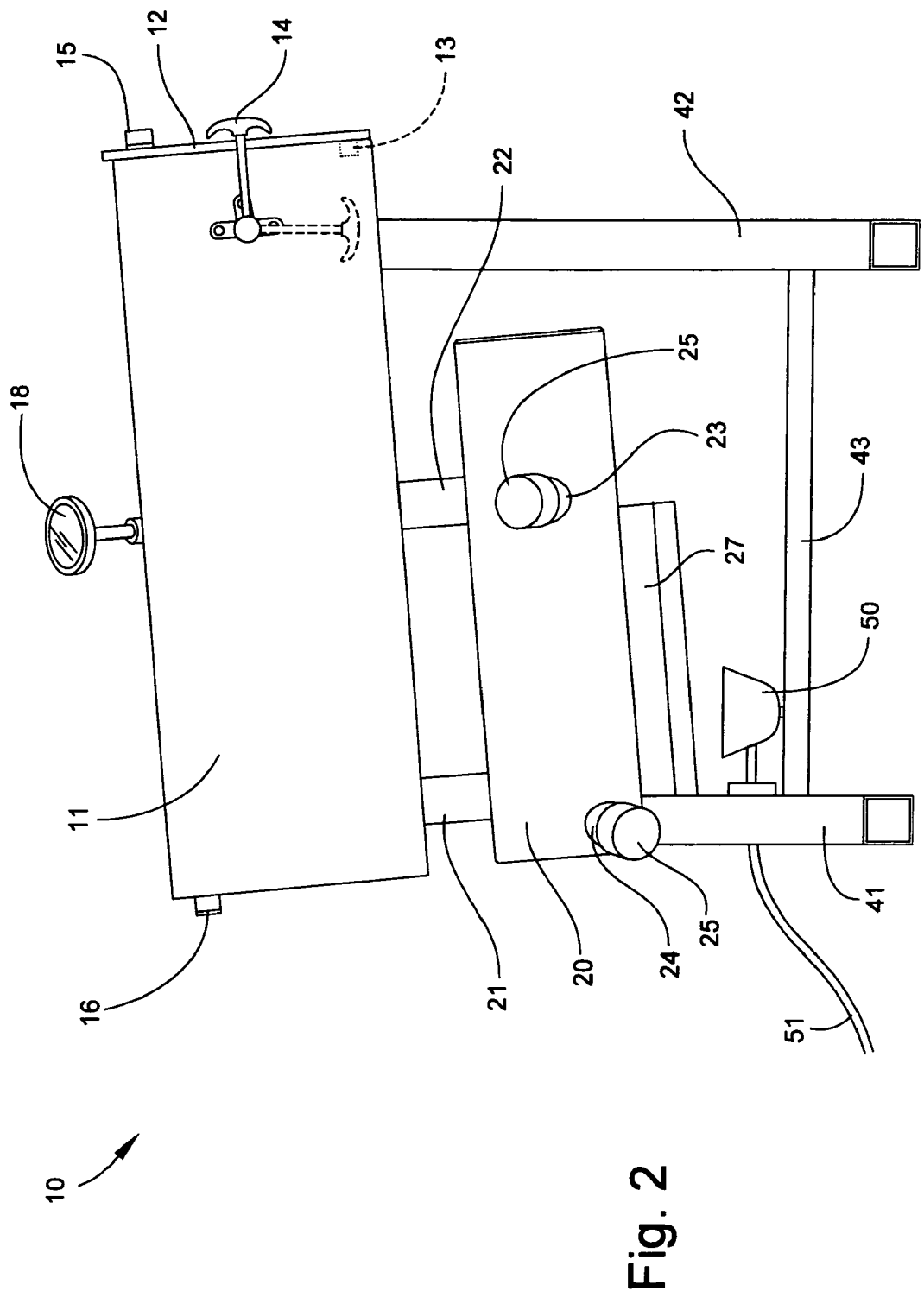
FIG. 2 is a side elevation of the steam cooker of FIG. 1.

Referring now specifically to the drawings, a steam cooker according to a preferred embodiment of the invention is illustrated in FIGS. 1 and 2, and shown generally at reference numeral 10. The steam cooker 10 generally comprises a food holding chamber 11 that receives steam from a steam chamber 20.

The steam cooker 10 can be made of any suitable material, but is preferably constructed of aluminum. The food holding chamber 11 and steam chamber 20 can be a variety of shapes, but are preferably rectangular.

Figure 3:
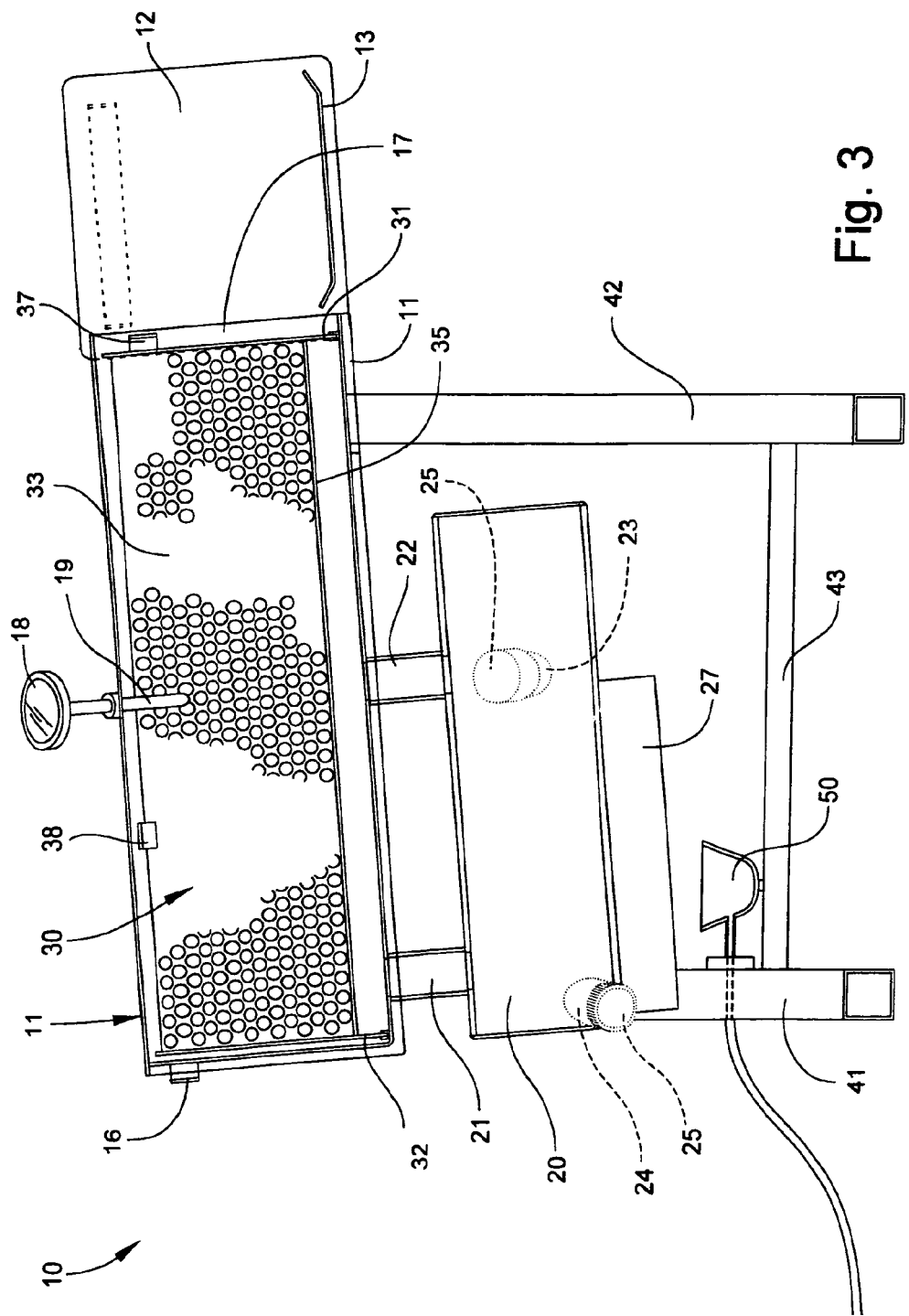
FIG. 3 is a cross sectional side elevation of the steam cooker of FIG. 1.

The holding chamber 11 has an opening 17 at one longitudinal end of the chamber 11, and a door 12 pivotally connected proximate the opening 17 to allow for access into the interior of the holding chamber 11. A retaining member, such as a lip 13, is mounted on the interior side of the door 12 proximate the bottom edge of the door 12, as shown in FIGS. 2 and 3. The lip 13 collects condensation formed on the interior side of the door 12 and prevents it from dripping out of the holding chamber 11 when the door 12 is opened. A locking mechanism, such as a latch 14, is pivotally mounted on the holding chamber 11 to lock the door 12 in the closed position, as shown in FIG. 2, to prevent accidental opening of the door 12 when the steam cooker 10 is cooking.

Two handles 15, 16 are mounted at opposite longitudinal ends of the holding chamber 11 to aid in the lifting and transporting of the steam cooker 10. One handle 15 is mounted on the exterior side of the door 12, as shown in FIG. 1.

As shown in FIG. 3, a temperature gauge 18 can be mounted on the exterior surface of the holding chamber 11. The gauge 18 is operatively connected to a thermometer 19 positioned inside the holding chamber 11 to display the temperature inside the holding chamber 11.

Figure 5:
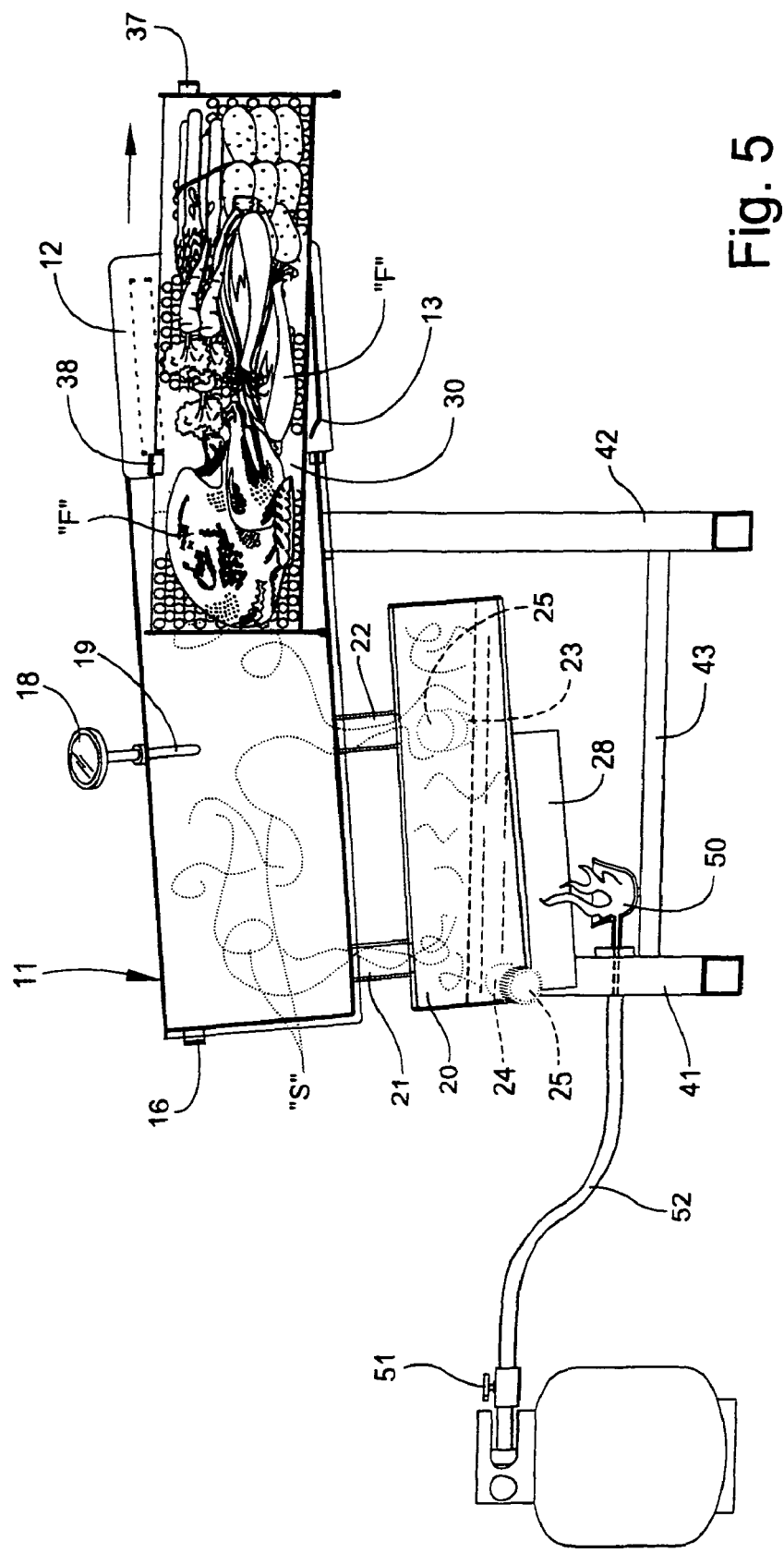
FIG. 5 is yet another cross sectional side elevation of the steam cooker of FIG. 1, showing the basket being removed from the holding chamber.

A container, such as a basket 30, can be positioned within the holding chamber 11. The basket 30 is perforated to allow steam in the holding chamber 11 to penetrate into the basket 30, and to allow drainage of any condensation. The basket 30 is preferably rectangular, and comprises a front panel 31, a rear panel 32, two side panels 33, 34, and a base panel 35. The front panel 31 and rear panel 32 have a greater height than the side panels 33, 34 so that the base panel 35 is elevated above the bottom of the holding chamber 11, as shown in FIG. 3. The basket 30 has an open top for receiving and removing food items "F" to be steamed, as shown in FIG. 7. When the door 12 is opened, the basket 30 is removable from the holding chamber 11, as shown in FIGS. 5 and 6, so that items "F" can be placed into or removed from the basket 30. A handle 37 mounted on the exterior surface of the front panel 31, and a handle 38 mounted on the top edges of the side panels 33, 34, can be used to lift the container 30.

The holding chamber 11 is connected to the steam chamber 20 via two pipes 21, 22 that extend from the top of the steam chamber 20 into the bottom of the holding chamber 11, as shown in FIGS. 2 and 3. The steam chamber 20 also includes a filling pipe 23 for receiving water into the steam chamber 20, and an exit pipe 24 for draining water from the steam tank 20. The filling pipe 23 is preferably mounted at approximately mid-level of the steam tank 20, and is angled upward at approximately sixty degrees. The exit pipe 24 is preferably mounted proximate a bottom corner of the steam tank 20, and is angled downward at approximately sixty degrees. Caps 25 are placed over the pipes 23, 24 to close the openings in the steam chamber 20 when water is not being poured into or drained from the steam chamber 20.

As shown in FIG. 3, the holding chamber 11 is positioned at an incline such that the longitudinal end at which the door 12 is mounted is elevated higher than the opposite end of the holding chamber 11. As such, condensation that forms inside the holding chamber 11 does not drip out of the holding chamber 11 when the door 12 is opened. The incline directs the condensation toward the pipes 21, 22 so that it flows back into the steam chamber 20.

As shown in FIG. 1, the holding chamber 11 and the steam chamber 20 are supported on a base surface by two legs 41, 42, respectively, that are joined by a transverse stabilizer bar 43. The legs 41, 42 can be mounted on wheels to facilitate transport of the cooker 10.

Figure 4:
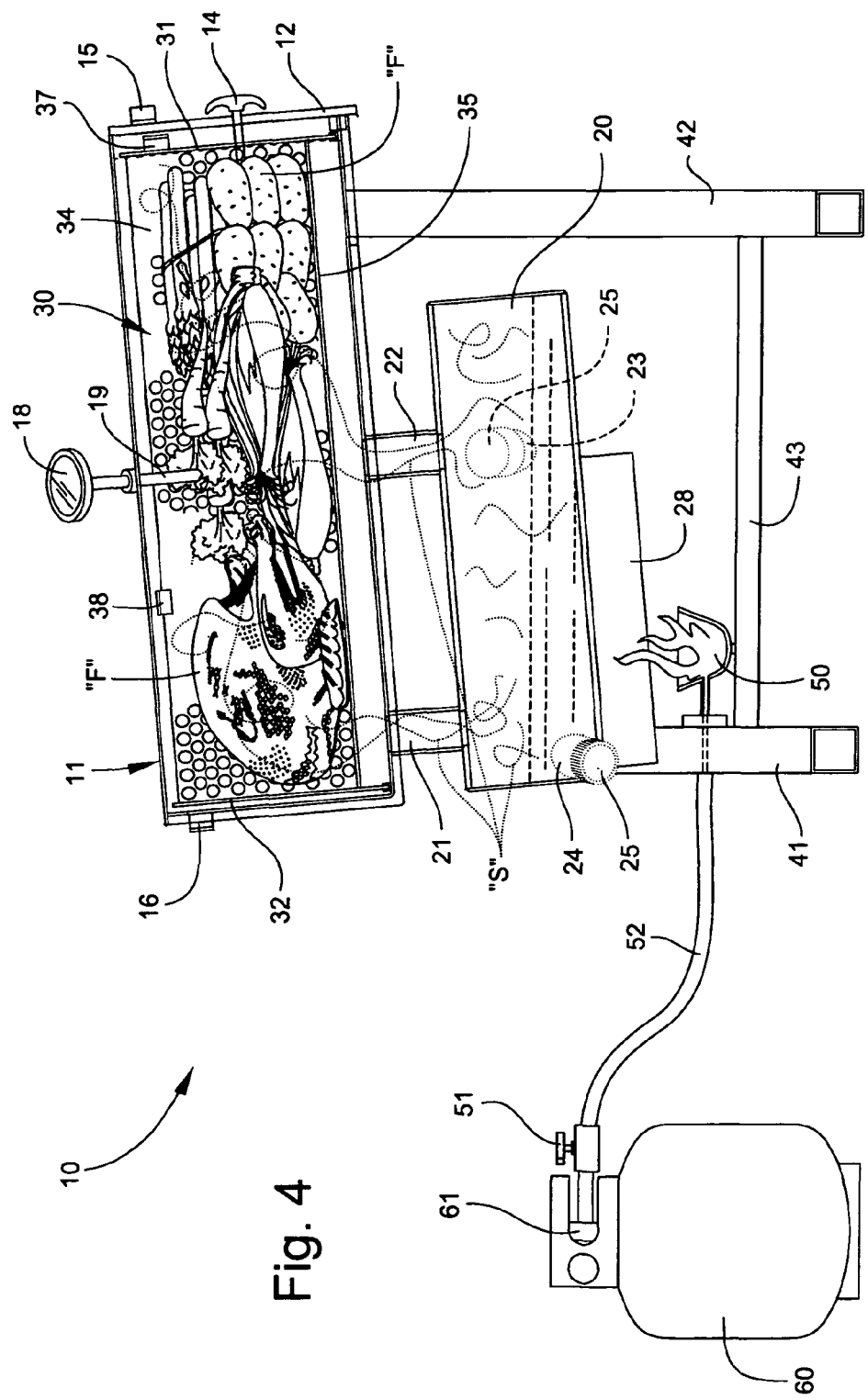
FIG. 4 is another cross sectional side elevation of the steam cooker of FIG. 1, shown in use with a gas tank.

A burner 50 is mounted on the stabilizer bar 43 under the steam chamber 20. The burner 50 provides heat to the steam chamber 20 to convert the water contained in the steam chamber 20 into steam "S". The steam "S" rises from the steam chamber 20 through pipes 21, 22 into the holding chamber 11 to heat the items "I" contained in the basket 30, as shown in FIG. 4. Baffles 27, 28 are mounted on opposite sides of the bottom of the steam chamber 20 to direct heat generated by the burner 50 to the steam chamber 20, as shown in FIG. 1. The burner 50 is operatively connected to an energy source, such as a gas tank 60. The gas tank 60 holds a supply of combustible gas, such as propane, butane or natural gas that is directed to the burner 50 via a hose 52. The gas tank 60 is preferably a conventional gas tank of the type used with household gas cooking grills. A tank valve 61 opens and closes the flow of gas from the tank 50. A T-valve 51 fitted to the tank 60 and the hose 52 regulates the flow of gas from the tank 60 thereby adjusting the amount of heat generated by the burner 50.

In a preferred method of using the steam cooker 10 according to the invention, the steam cooker is used to cook food as illustrated in FIGS. 4-7. The hose 52 of the burner 50 is connected to the gas tank 60. Water is introduced into the steam chamber 20 by removing the cap 25 from the filling pipe 23 and pouring water into steam chamber 20 until the water is visible just below the filling pipe 23. The cap 25 is placed back on the filling pipe 23, and hand-tightened. The tank valve 61 on the gas tank 60 is turned to the open position. The T-valve 51 is turned just until the gas can be heard coming out of the tank 60. The burner 50 is ignited by placing a flame over the burner 50, and the T-valve 51 is now turned to a fully open position.

The basket 30 is removed from the holding chamber 11, and filled with food items "F" to be steam cooked. When the temperature inside the holding chamber 11 reaches approximately 180 to 190 degrees Fahrenheit, the basket 30 is positioned inside the holding chamber 11. The door 12 is closed and the latch 14 is turned to the locked position to prevent the door 12 from opening during cooking. The T-valve 51 is turned toward the closed position until there is a minimal flame emanating from the burner 50. During cooking, the flame should be maintained at a level such that the temperature within the holding chamber 11 is approximately between 185 and 200 degrees Fahrenheit. The temperature should not be allowed to exceed 200 degrees Fahrenheit.

When the food is fully cooked, the T-valve 51 and the tank valve 61 are turned to the fully closed position to completely stop the flow of gas and extinguish the flame of the burner 50. The latch 14 is unlocked, and the door 12 is opened. Due to the hot temperature of the steam emanating from the holding chamber 11, the operator should keep his face away from the door 12 when opening. The basket 30 is removed from the holding chamber 11, as shown in FIGS. 4 and 5. Gloves should be worn when removing the basket 30 from the holding chamber 11.

When cooking is complete, any water in the steam chamber 20 is drained by removing the cap 25 from the exit pipe 24 and allowing the water to drain out. When the steam cooker 10 has cooled, it can be cleaned by removing the basket 30 and washing it with antibacterial soap and water. The rest of the steam cooker 10 can also be washed with water and antibacterial soap. After cleaning, the door 12 on the holding chamber 11 is left open and the steam cooker 10 is allowed to air dry.

A wide variety of foods can be cooked by the steam cooker 10, such as potatoes, sweet potatoes, dove wrapped in bacon, chicken, turkey, pork roast or ribs, low country boil of vegetables and sausage, hot dogs, eggs and seafood such as shrimp, crab lobster, clams, oysters and fish. In addition, buns can be warmed by placing the buns in the steam cooker 10, and turning off the burner 50 after the meat has been cooked.

Although the steam cooker 10 is described above as being used to steam cook food, the invention is not limited to cooking. The invention has other applications such as medical instrument sterilization and food blanching.

A steam cooker and method for using same are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A food cooker comprising:
   (a) a steam chamber for initially containing water;
   (b) heating means for converting the water in the steam chamber to steam;
   (c) a holding chamber in fluid communication with the steam chamber for receiving the steam, and having an opening proximate a first end for receiving a food item to be cooked by the steam, the holding chamber being positioned at an angle of inclination whereby condensation formed on an interior surface of the holding chamber drains away from the opening and towards a second end positioned lower than the opening;
   (d) a door proximate the opening in the holding chamber whereby the opening is selectively opened and closed; and
   (e) a retaining member positioned on an interior surface of the door proximate a bottom edge of the door for collecting condensation formed on the interior surface of the door whereby the condensation is prevented from escaping the holding chamber when the door is opened.

2. A food cooker according to claim 1, further comprising a container for containing the food item to be cooked by the steam, the container for being positioned within the holding chamber, and wherein at least a portion of the container is removable from the holding for removing the food.

3. A food cooker according to claim 2, wherein the steam chamber, the holding chamber and the container are made of aluminum.

4. A food cooker according to claim 2, wherein the container comprises a basket having a plurality of apertures, and the further wherein the holding chamber is shaped to conform to the basket.

5. A food cooker according to claim 1, further comprising a first handle mounted at the first end of the holding chamber and a second handle mounted at the second end of the holding chamber for facilitating lifting and movement of the food cooker.

6. A food cooker according to claim 1, further comprising a latch for locking the door in the closed position.

7. A food cooker according to claim 1, further comprising at least one leg member for supporting the holding chamber on a base surface.

8. A food cooker according to claim 1, further comprising first and second leg members for supporting the steam chamber and the holding chamber on a base surface, and wherein the first and second leg members are connected by a transverse stabilizer bar.

9. A food cooker according to claim 1, wherein the heating means comprises a burner positioned proximate the steam chamber, wherein the burner heats the steam chamber to convert the water to steam.

10. A food according to claim 9, wherein the heating means further comprises a tank containing a combustible gas in communication with the burner.

11. A food cooker according to claim 10, wherein the combustible gas comprises one or more selected from the group of propane, butane and natural gas.

12. A food cooker according to claim 10, wherein the heating means further comprises at least one valve connected to the tank for regulating the flow of the gas from the tank to the burner.

13. A food cooker according to claim 1, wherein the steam chamber defines a first opening for receiving the water and a second opening proximate a bottom of the steam chamber for draining the water, the first opening being positioned higher than the second opening.

14. A food cooker according to claim 1, further comprising a temperature gauge operatively connected to a thermometer positioned inside the holding chamber for displaying the temperature inside the holding chamber.

* * * * *